US010617094B2

(12) United States Patent
Johanningmeier

(10) Patent No.: US 10,617,094 B2
(45) Date of Patent: Apr. 14, 2020

(54) FREE STALL SYSTEM AND FREE STALL DIVIDER HAVING FIBERGLASS PORTION

(71) Applicant: TJ's Fencing, Inc., Harpers Ferry, IA (US)

(72) Inventor: Travis Johanningmeier, Ferry, IA (US)

(73) Assignee: TJ'S FENCING COMPANY, Harpers Ferry, IA (US)

( * ) Notice: Subject to any disclaimer, the term of this patent is extended or adjusted under 35 U.S.C. 154(b) by 362 days.

(21) Appl. No.: 15/480,037

(22) Filed: Apr. 5, 2017

(65) Prior Publication Data

US 2017/0280670 A1    Oct. 5, 2017

Related U.S. Application Data

(60) Provisional application No. 62/398,193, filed on Sep. 22, 2016, provisional application No. 62/348,255,
(Continued)

(51) Int. Cl.
*A01K 1/00* (2006.01)
*B05B 13/02* (2006.01)
(Continued)

(52) U.S. Cl.
CPC .......... *A01K 1/0005* (2013.01); *A01K 1/0017* (2013.01); *B05B 13/0207* (2013.01); *B05C 9/10* (2013.01); *B24B 5/38* (2013.01)

(58) Field of Classification Search
CPC .......... B05B 13/0207; B05C 9/10; B24B 5/38
See application file for complete search history.

(56) References Cited

U.S. PATENT DOCUMENTS 4,736,545 A * 4/1988 Moss ...................... B24B 9/007
                                                        409/165
5,188,872 A * 2/1993 Quigley .............. B29C 53/8058
                                                       114/102.31
(Continued)

FOREIGN PATENT DOCUMENTS

EP          0662391          7/1995

OTHER PUBLICATIONS

Scantoo.L USA. Seantool 75 CGC Wet Centerless Grinder—YouTube. Nov. 19, 2015. https://www.youtube.comwatch?v=8fweESDJ4GE.
(Continued)

*Primary Examiner* — Kelly M Gambetta
(74) *Attorney, Agent, or Firm* — Patterson Thuente Pedersen, P.A.

(57) ABSTRACT

Free stall systems having free stall units arranged in a substantially parallel relationship having coated rail members. The coated rail members comprising an elongated fiberglass material manufactured by grinding a starting fiberglass material prior to a coating being applied. The starting fiberglass material can be reclaimed and reused from other industries such that the fiberglass material may be cut to remove unwanted metal end portions and/or cut to a desired size prior to the grinding and coating steps. The coated fiberglass material can be coated with a UV-resistant material or other coating to maintain the longevity of the fiberglass member during its use. The coated fiberglass apparatus may be utilized in free stall systems, gates, fencing materials and other applications where a solid fiberglass rod or hollow fiberglass tube having a desired coating is desired.

10 Claims, 17 Drawing Sheets

Related U.S. Application Data filed on Jun. 10, 2016, provisional application No. 62/318,486, filed on Apr. 5, 2016.

(51) Int. Cl.
 *B05C 9/10* (2006.01)
 *B24B 5/38* (2006.01)

(56) References Cited

U.S. PATENT DOCUMENTS

| | | | |
|---|---|---|---|
| 6,872,337 B2 * | 3/2005 | Mellentine | B05B 7/061 264/250 |
| 2013/0198967 A1 | 8/2013 | Ortiz | |
| 2014/0099870 A1 | 4/2014 | Lee et al. | |

OTHER PUBLICATIONS

International Search Report and Written Opinion for PCT/US17/26190 dated Sep. 7, 2017.

\* cited by examiner

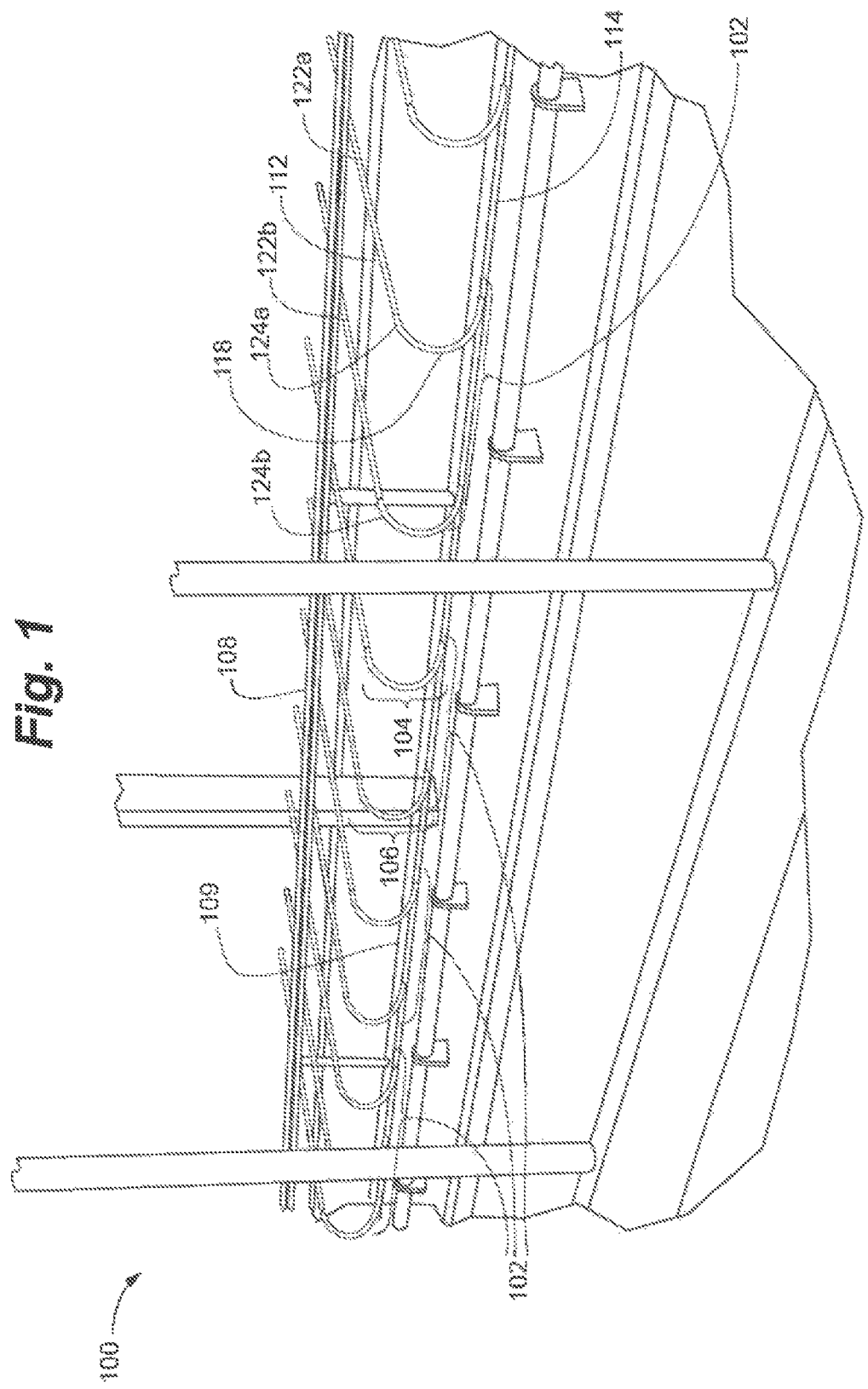

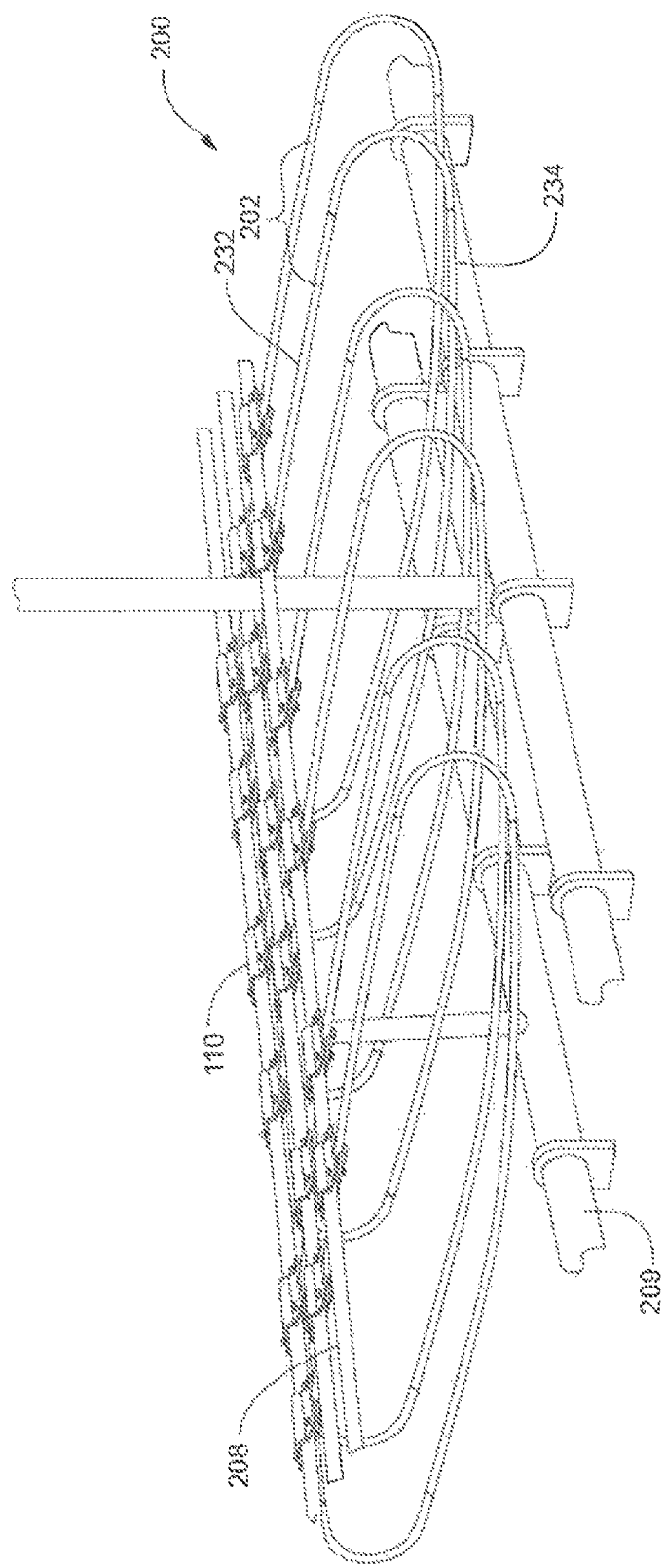

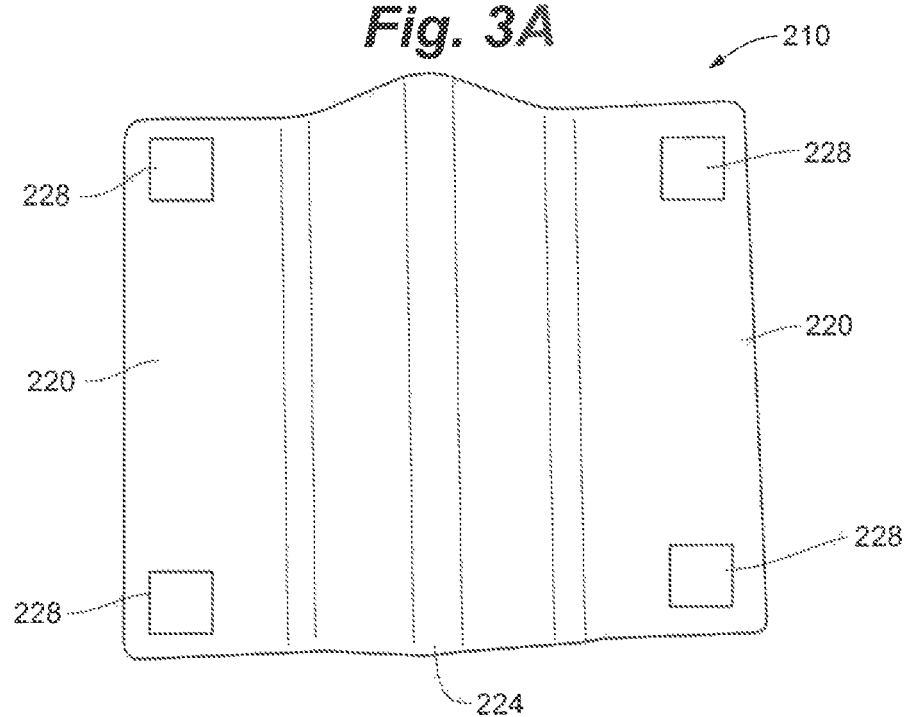
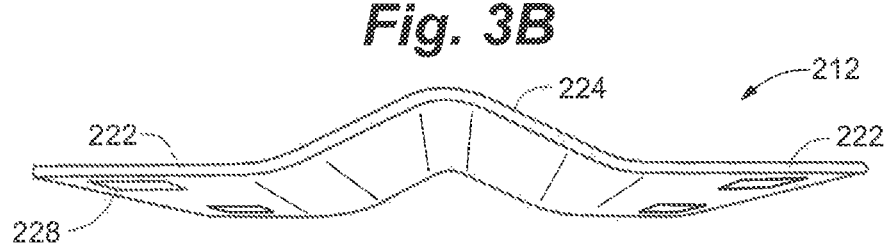

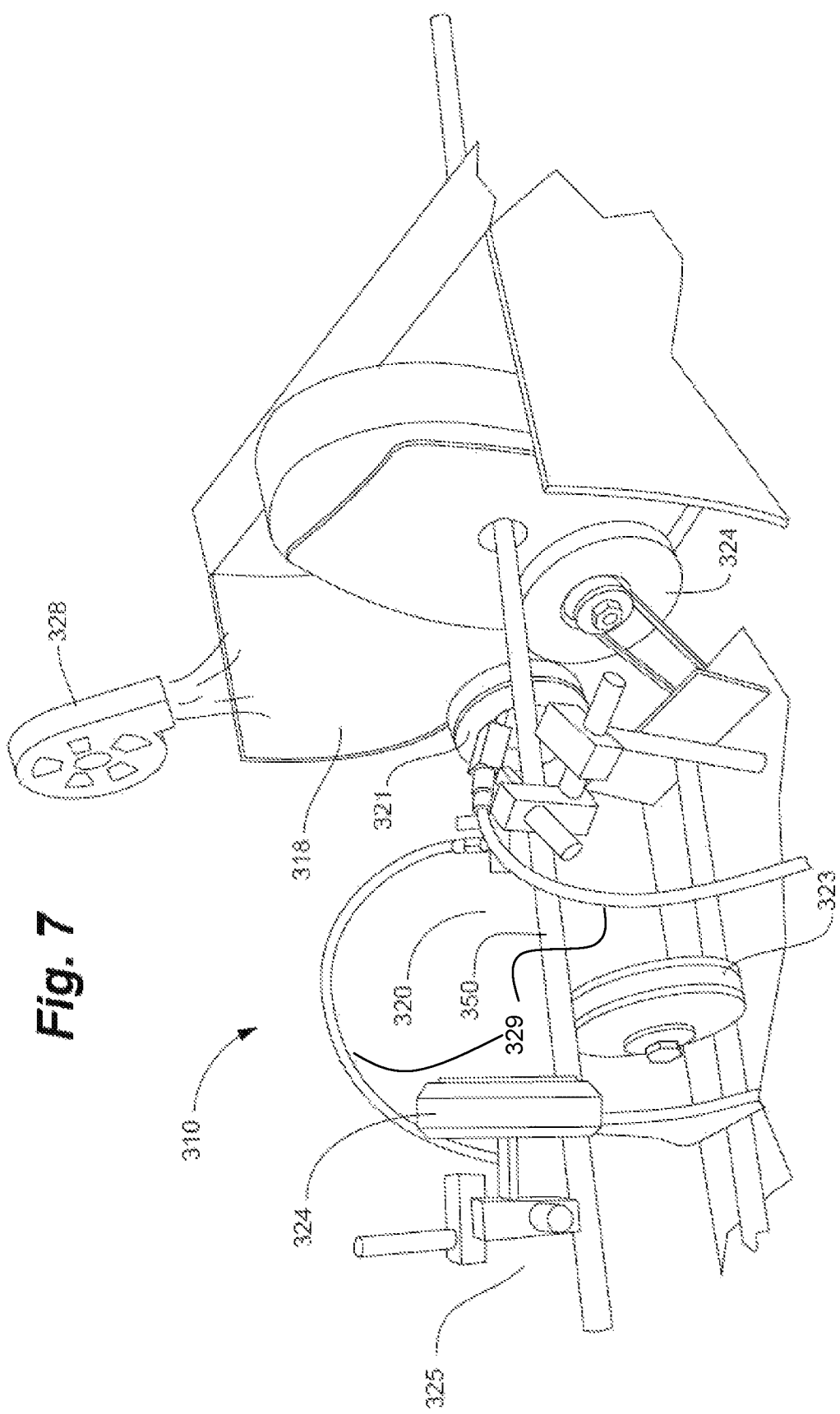

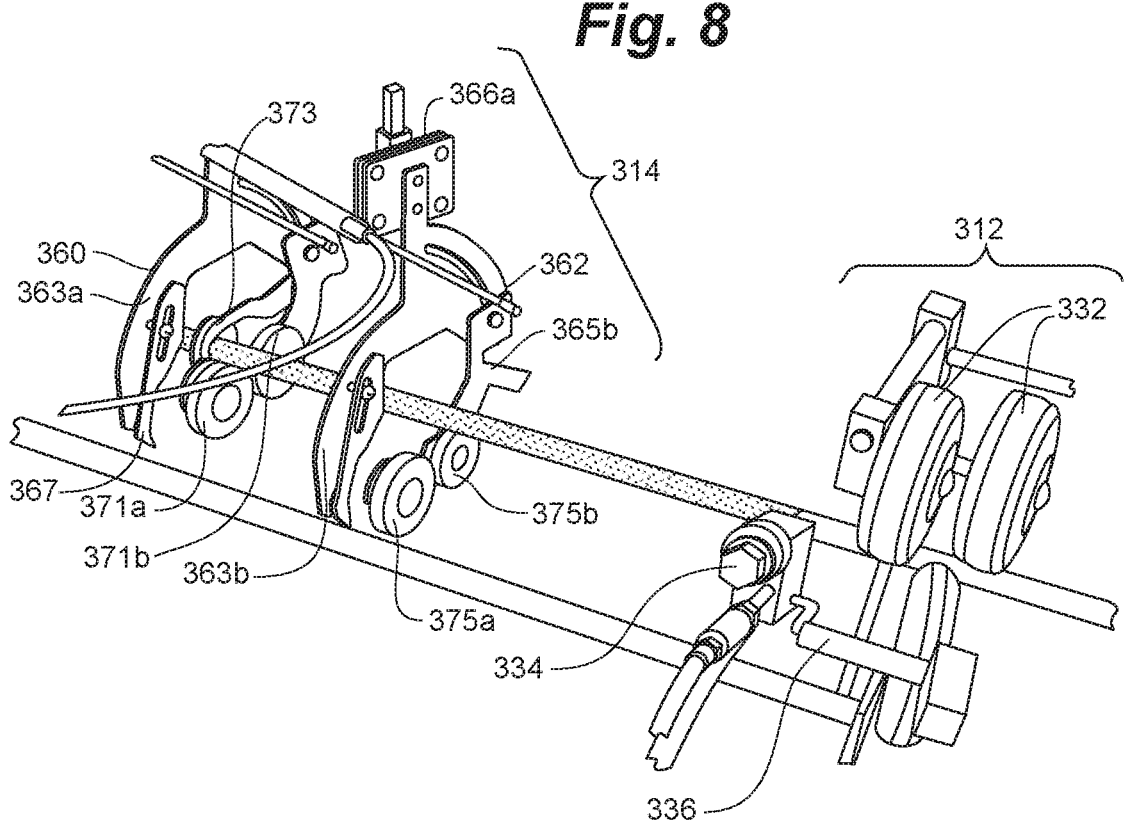

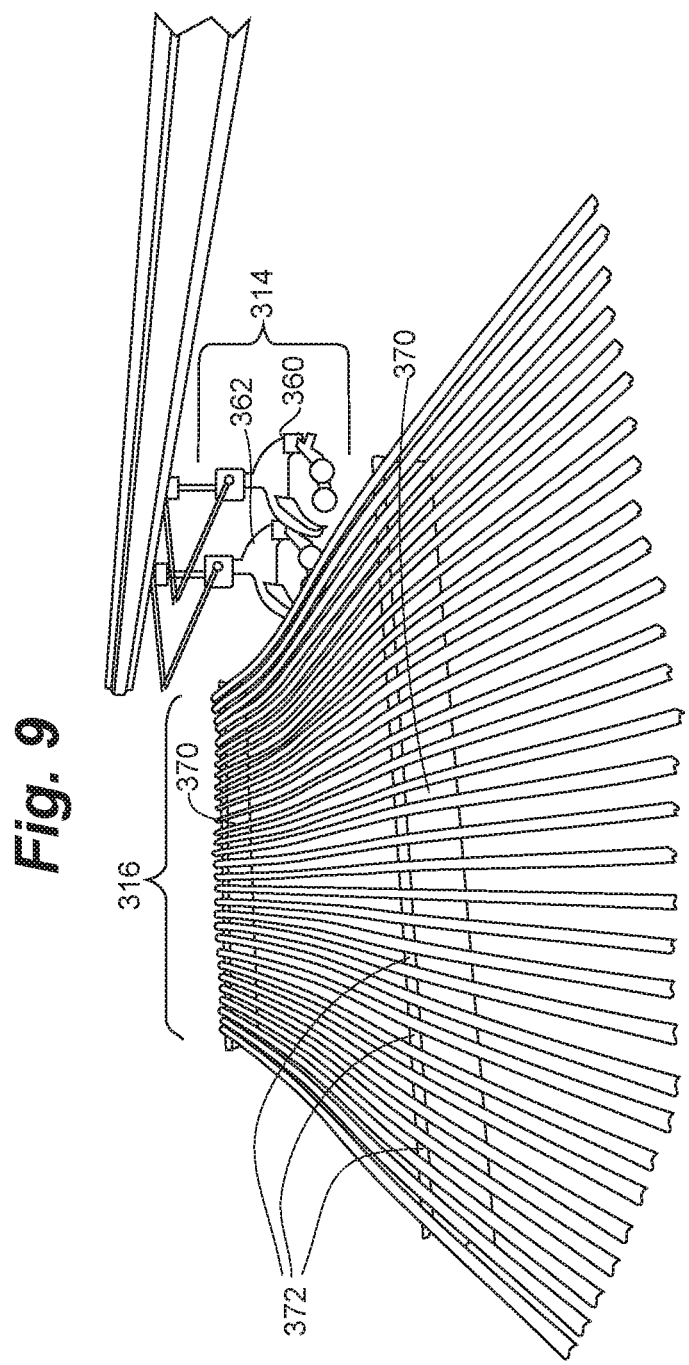

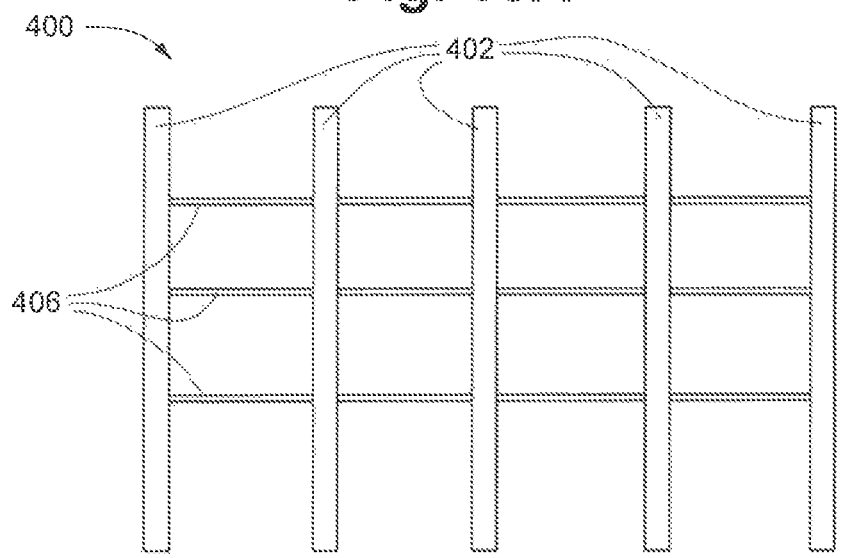
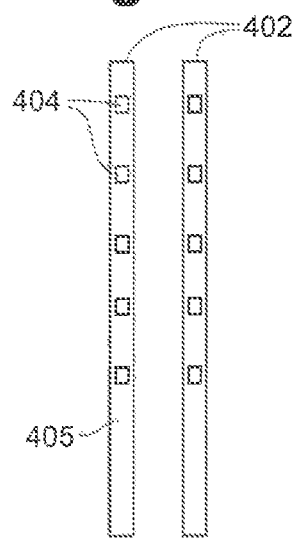
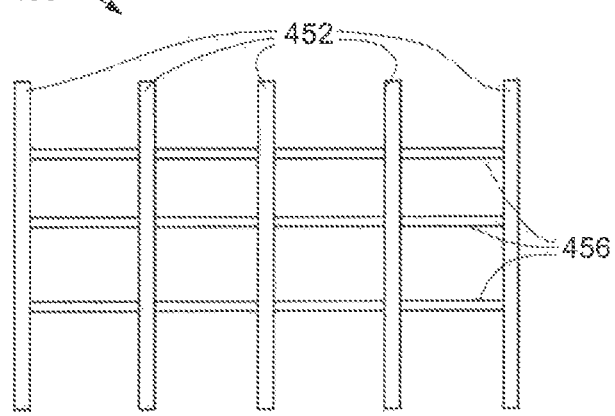

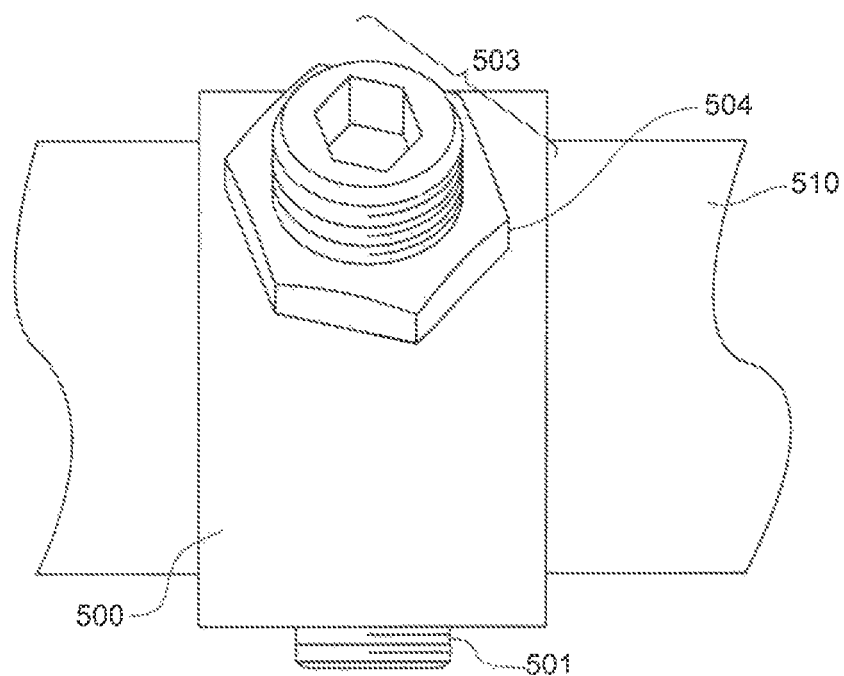

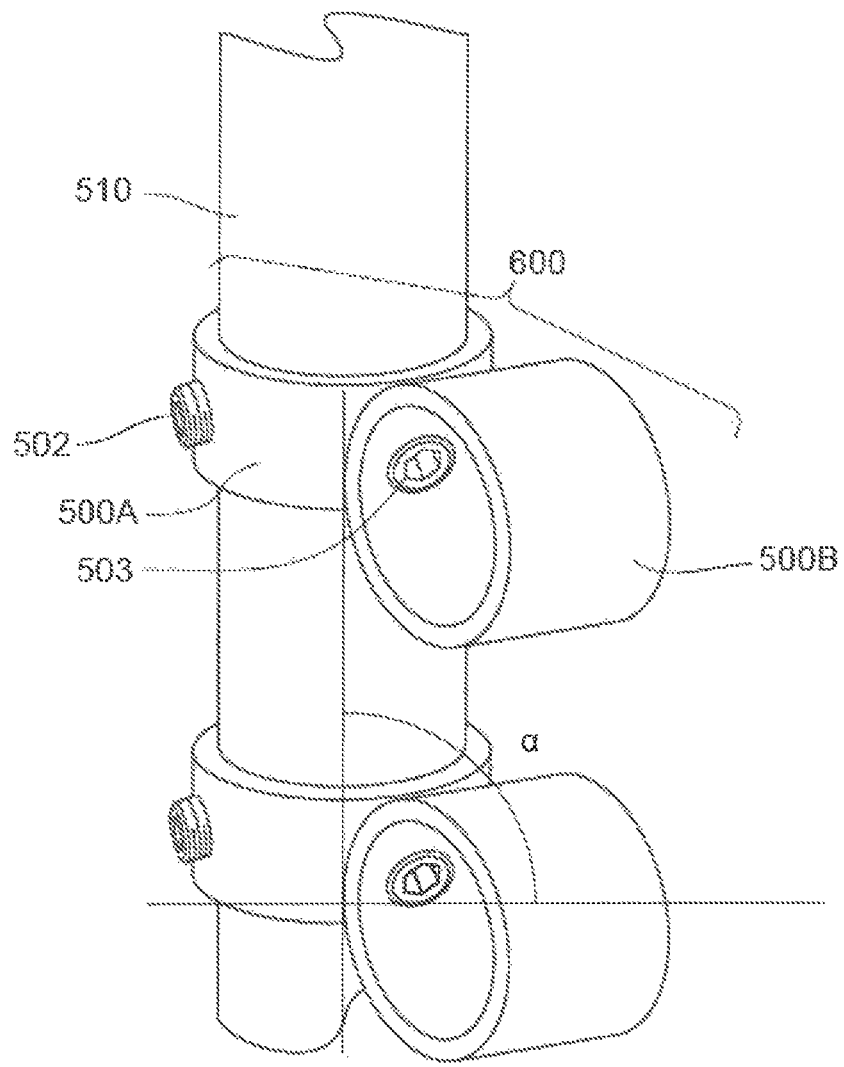

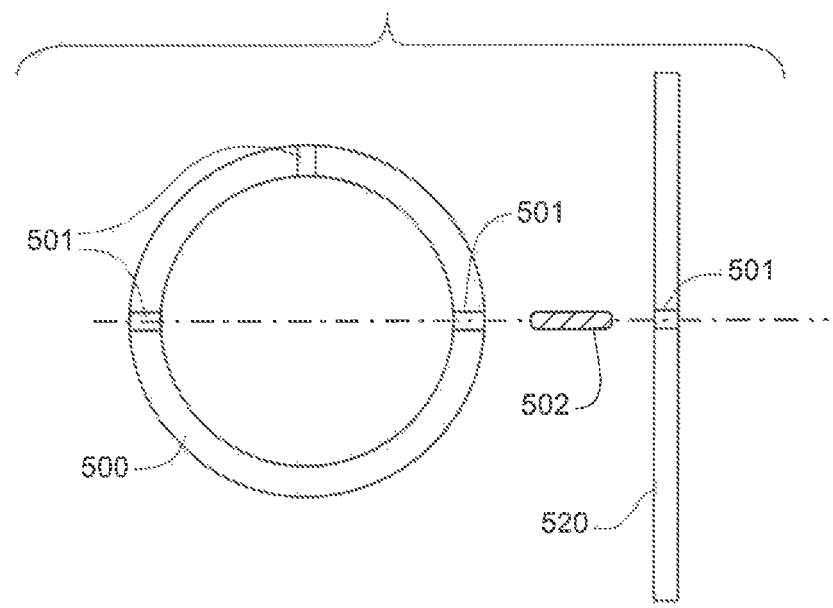
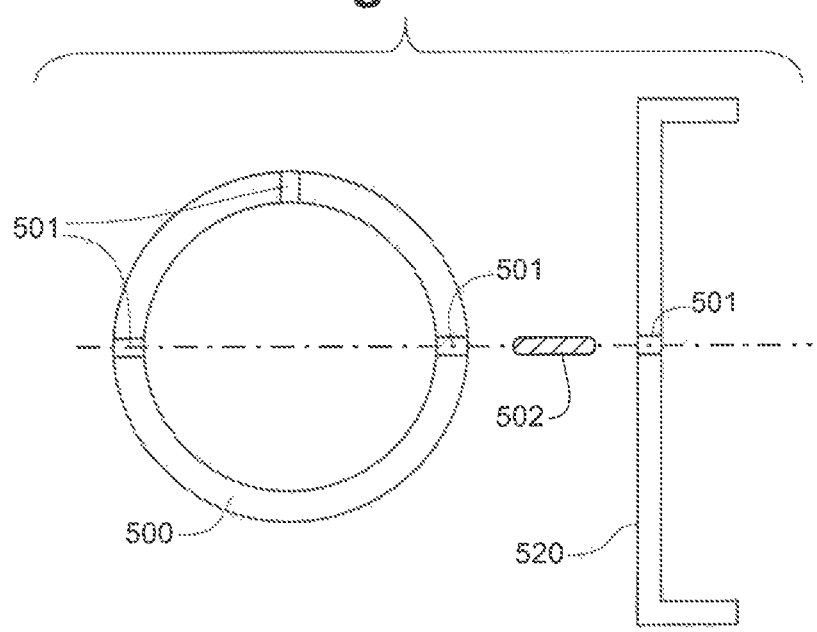

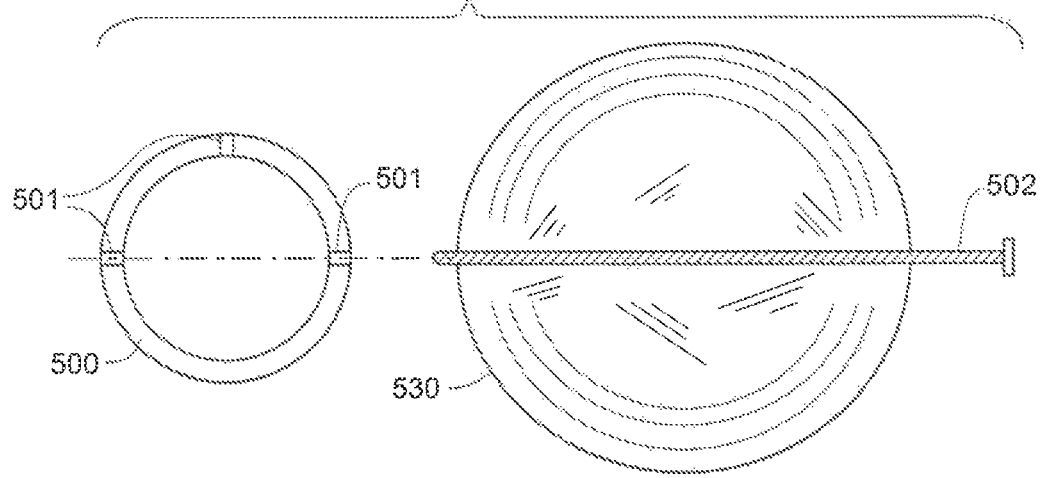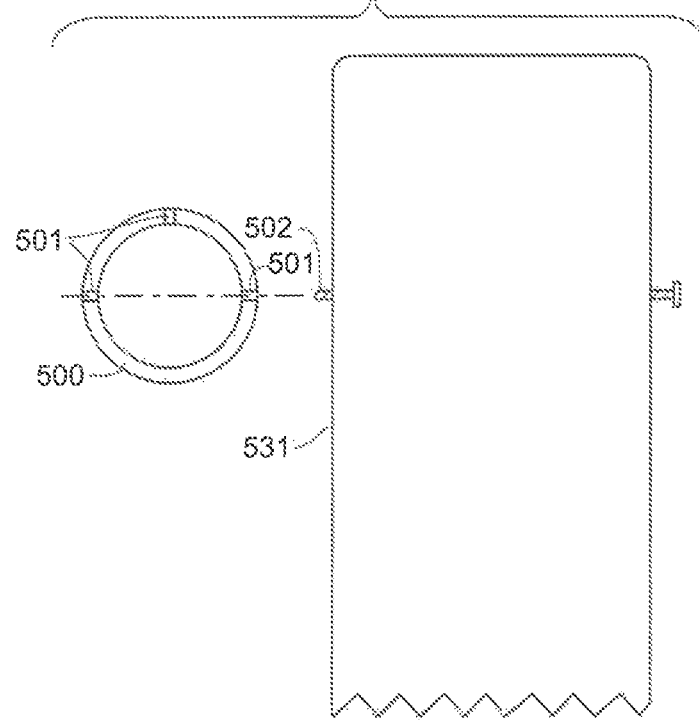

FREE STALL SYSTEM AND FREE STALL DIVIDER HAVING FIBERGLASS PORTION

RELATED APPLICATIONS

The present application claims the benefit of U.S. Provisional Application No. 62/318,486, filed Apr. 5, 2016, U.S. Provisional Application No. 62/348,255 filed Jun. 10, 2016, and U.S. Provisional Application 62/398,193 filed Sep. 22, 2016, each of which is hereby incorporated herein in its entirety by reference.

TECHNICAL FIELD

The present invention relates generally to fiberglass, fencing, gates, free stalls and free stall dividers having at least a portion thereof comprising fiberglass, and particularly to the devices, systems, and methods for achieving fiberglass free stalls, free stall dividers and fiberglass apparatus, more particularly to the devices, systems and methods for achieving fiberglass free stalls and fiberglass apparatus having coatings.

BACKGROUND

In the dairy, ranching, and farming industry, the use of fences, gates and free stall barns to house and maintain animals such as dairy cattle and horses is well known in the art. Particularly, when properly designed, fences, pens, and free stall barns provide a convenient method of managing dairy cattle by providing a comfortable living and feeding environment that allows the cattle to move freely within the confined area. Such barn styles are also designed to shade and protect animals from inclement weather conditions. In a typical design, the barn includes several free stall partitions that are adjacently arranged to maximize space capacity and to provide a plurality of resting areas that are sized to accommodate individual cattle. Additionally, in other examples such as use in a livestock pen area, such as a horse pasture, the enclosure may include a boundary fence or similar enclosure with one or more gates to enable feeding and pasturing of the horses. As such, key considerations taken into account when implementing such designs are the initial and on-going maintenance costs, ease of installation, as well as adequate spacing and sizing of the stalls, fencing and/or gates. Moreover, an important consideration is that of being able to adapt the fencing design to the contour of the land and surrounding structures which may be uneven, unaligned, or not of uniform size and spacing.

Conventionally, most live stock enclosures, stalls, fencing and/or gates are generally composed of stainless steel or wooden materials that rust, corrode, and mold easily. This in turn leads to decreased wear life and maintenance costs associated with having to continuously replace the enclosures. Additionally, with most free stall systems, the stalls are typically attached to the support frames of the barn structures, thereby making it difficult to adjust the individual stall sizes and requiring increased installation times and costs. To address such concerns, other conventional systems have employed the use of prefabricated free stall assemblies. Drawbacks to such designs, however, include decreased wear life and increased maintenance costs associated with the use of materials that are easily corroded and rusted due to the barn environment with livestock.

Additionally, most fences and free stall systems are designed with the construction materials attached to each other and to surrounding structures using rigid connectors that may be pre-manufactured having square corners, half-corners, or possibly only a small number of possibilities for making connections. To address such constraints, fences, gates and structures that are used to contain livestock are limited in their versatility and adaptability, forcing a design that is limited and may not properly follow the contour of the land or existing structures. Drawbacks to such designs include gaps that may occur in attempting to follow the contour of the land and irregularities in structures, or the need for installing excessive fencing and stall materials to accommodate these contours and irregularities. Additionally, for the craftsman of these fencing, gate and stall materials, there is a need to carry an assortment of connectors resulting in higher inventory carrying cost.

Therefore, there still exists a need in the art for a versatile and cost effective, light weight, fence, gate and/or free stall design that has an increased wear life that is easy to install, resistant to corrosion and rust, and that may have the option to swivel to any angle in order to accommodate the attachment of fencing, gate and stall materials to conform to the contour of the land and the irregularities and non-uniformity farm and ranch structures

SUMMARY

Aspects of the present invention herein generally relate to systems and methods for manufacturing a fiberglass apparatus for use in free stall systems and methods for providing resting and feeding environments for dairy cattle. In certain aspects, the present invention is directed to a fiberglass free stall system comprising a plurality of free stall units arranged in a substantially parallel relationship to one another and spaced apart so as to define an opening sized to accommodate an animal, such as dairy cattle. In embodiments, each of the plurality of free stall units include a first and a second divider that is connected to an upper and lower center support rod via a clamp member to secure positioning and placement of the free stall units, which can be within a barn. The first and second dividers each can comprise an upper and lower rail member that are joined via a connection loop having a generally arcuate configuration. In certain aspects, the upper and/or lower rail members can comprise fiberglass, in certain aspects a solid fiberglass rod, in certain other aspects a fiberglass tube. In certain aspects, the connection loop is a U-shaped tube having two ends, such that one end of the upper rail member can be inserted into one end of the connection loop and one end of the lower rail member can be inserted into the other end of the connection loop. In certain aspects, the other end of the upper rail member can be inserted into one of a second connection loop and the other end of the lower rail member can be inserted into the other end of the second connection loop. In some aspects, the connection loops comprise a metal material, such as aluminum, stainless steel, galvanized steel, or a metal alloy.

Another aspect of the present invention is directed to a system for manufacturing a fiberglass apparatus, the system comprising at least one cutting station, a holding station, a washing station, a grinder station, a coating station and/or a drying station, each station in the system arranged to form a fiberglass apparatus of the present invention.

In certain other aspects, the present invention is directed to a method of manufacturing a fiberglass apparatus, the method comprising sizing the fiberglass apparatus to a predetermined length at a cutting station by severing at least one end of an initial fiberglass apparatus. In some aspects, the at least one end comprises a metal component that is severed off from the remaining portion of the initial fiberglass apparatus. Next, the initial fiberglass apparatus may be maintained in a holding frame at a holding station until the apparatus is ready for transfer into a conveyor assembly. In some aspects, the initial fiberglass apparatus is transferred directly from the severing station to the conveyor assembly without being held. In certain aspects, off set wheels are configured in the conveyor assembly to continuously rotate the initial fiberglass apparatus and to transfer the apparatus through a surface preparation process. During the surface preparation process, the initial fiberglass apparatus may optionally undergo a prewash at a wash station before being ground at a grinder station. At the grinder station, the initial fiberglass apparatus may be ground utilizing an abrasive apparatus with a grit size in a range of about 30 to about 100 grit, in other aspects about 40 to about 90 grit, in other aspects about 50 to about 85 grit, and in certain other aspects about 60 to about 80 grit. In some aspects, the abrasive apparatus comprises a diamond grit blade. In some aspects the fiberglass apparatus is spun while undergoing the prewash and/or the grinding process. In certain aspects, once the surface has been ground, the fiberglass apparatus continues to be spun and is exposed to compressed air and/or a blower directed toward the fiber apparatus to blow off any liquid, such as water or any other prewash solvent, to dry the apparatus before the apparatus reaches the coating station. In certain other aspects, the ground initial fiberglass apparatus is conveyed into a coating station where one or more coating layers is applied to the surface of the fiberglass apparatus. In the coating station, the fiberglass apparatus can be continuously rotated by off-set wheels that transverse the distance of the fiberglass apparatus in the conveyor assembly, such that an even layer of the coating can be applied to the fiberglass apparatus. In some aspects, the coating material comprises a UV resistant material. In other aspects, the coating applied is not a UV resistant-coating. In certain other aspects, a first primer coating is applied and then a second coating is applied, wherein the second coating may comprise a UV-resistant material.

In certain aspects, during the coating process the fiberglass apparatus portion that has been coated is supported by a transfer assembly until the entire fiberglass apparatus is coated. In certain aspects, the transfer assembly comprises a transfer arm assembly, which in certain aspects, the transfer arm assembly wheels are allowed to freely rotate with the spinning of the rod, which transports the apparatus from the conveyor assembly, and more particularly the coating station, to a drying station where the coated fiberglass apparatus is cured. In certain aspects, the transfer assembly comprises two or more transfer arm assemblies that are spaced apart to support the coated fiberglass apparatus as it is coated. Once the entirety of the fiberglass apparatus is coated, the transfer assembly transfers the coated fiberglass apparatus to the drying station. In certain aspects, the drying station contains a plurality of supports that are spaced apart to support the length of the fiberglass apparatus. The coated fiberglass apparatus may be further cut to other desired lengths after the coating and/or drying stations.

In one related aspect of the present invention, the fiberglass apparatus may be implemented in a fencing system, in some aspects an electrical fencing system, and in other aspects a gate. In certain aspects, the fencing system comprises a plurality of fencing posts equidistantly arranged and each having at least one aperture formed therein so as to receive another component, the fencing posts comprising the fiberglass apparatus according to the present invention. In some aspects, the other component is another fiberglass apparatus according to the present invention having a diameter smaller than the diameter of the vertical fencing posts, such that the smaller diameter fiberglass apparatus can extend through an aperture in the larger diameter fiberglass apparatus.

In certain other aspects, the other component comprises a conductive element that extends through at least one aperture of a fiberglass apparatus, in certain other embodiments at least one aperture of two or more adjacent fiberglass apparatuses thereby forming an electrical fencing barrier. In certain aspects, the conductive element comprises a metal wire. In certain aspects, each of the plurality of fencing posts that form the vertical fencing posts can comprise fiberglass, in certain aspects a solid fiberglass rod, or in certain other aspects a fiberglass tube. In certain aspects, the horizontal smaller diameter fiberglass apparatus can comprise fiberglass, in certain aspects a solid fiberglass rod, or in certain other aspects a fiberglass tube. Further, in other embodiments, the conductive element can comprise an electrical wire, in certain aspects a solid fiberglass rod, or in certain other aspects a fiberglass tube.

In other related aspects of the present invention, the fiberglass apparatus may be implemented in a free stall system comprising a plurality of free stall units arranged in a substantially parallel relationship to one another and spaced apart so as to define an opening sized to accommodate dairy cattle. In certain aspects, each of the plurality of free stall units include a first and a second divider that is connected to an upper and lower center support rod via a clamp member to secure positioning and placement of the free stall units within a barn. The first and second dividers each can comprise an upper and lower rail member that are joined via a connection loop having a generally arcuate configuration. In certain aspects, the upper and/or lower rail members can comprise a solid fiberglass rod, and in certain other aspects a fiberglass tube.

In certain other aspects, the present invention is directed to one or more free stall dividers, each of the free stall dividers comprising an upper and lower rail member that are joined via a connection loop having a generally arcuate configuration. In certain aspects, the upper and/or lower rail members can comprise fiberglass, in certain aspects a solid fiberglass rod, in certain other aspects a fiberglass tube. In some aspects the upper and/or lower rail members can be used for two free stall dividers. Each of the two free stall dividers comprising a connection loop.

Another aspect of the present invention is directed to a method for manufacturing a fiberglass free stall system, comprising fabricating an upper and lower rail member utilizing a grinding technique having a grit size in a range between approximately 30 to 100 grit, with a grit size of about 80 grit being preferable in certain aspects; coating the upper and lower rail members with a ultraviolet coating; providing a connection loop comprising a corrosion resistant material; attaching the distal end of each of the upper and lower rail members to the connection loop via a fastener to form a free stall divider; attaching the proximal end of the upper rail member to a first substantially horizontal structure; attaching the proximal end of the lower rail member to a second substantially horizontal structure located below the first substantially horizontal structure; and installing a plurality of free stall dividers in a free stall barn.

Another aspect of the present invention herein generally relate to a swivel connector for the attachment of rails, fences, gates, and free stall construction materials and a method for designing and installing rails, fences, gates, and free stall systems on farms and ranches for enclosing and maintaining livestock. In certain aspects, the present invention is directed to attaching one rail to another rail while allowing any angle of alignment between the two rails by use of the swivel connector. In one embodiment, the two rails being attached may be of a standard fiberglass rail design, and they may be of the same diameter or of different standard diameters. In another embodiment, one piece of the swivel connector may be separated from the other, allowing it to be used singularly for attaching a rail to a suitably configured baseplate, post, or other structure. In another embodiment a swivel connector may be joined with one or more pieces of other swivel connectors for attaching three or more rails to each other or to any other structure. In some aspects, all swivel connector pieces that are used may be sized to accommodate rails of equivalent diameter. In embodiments, the swivel connector pieces that are used may be sized to accommodate rails of differing sizes. In embodiments, all swivel connector pieces that are used may be firmly secured to the rail which they support by use of a set screw or other securing device. In embodiments, swivel connector pieces that are used may provide only radial support for a rail while allowing the rail to move axially through the connector, or to rotate within it, after final assembly. In embodiments where a swivel connector is not rigidly attached to the rail it supports, it may be configured to be rigidly attached at a later time by the use of a set screw or other suitable securing device.

In the afore described embodiments, the present invention is directed at the use of a solid fiberglass rod as being the rail material for constructing the fence, pen, gate, or free stall barn system. However the rail may be composed of any other suitable railing material including wood, plastic, steel, or other metal; and it may be either solid or hollow. In the afore described embodiments, the present invention is directed at the use of the swivel connector as providing the structural rigidity of the final assembly of the fence, pen, gate, or free stall barn system. However, in some embodiments the final rigid assembly may be additionally secured by the use of an adhesive or cementing material, or brazing or welding, to increase permanence and structural strength of the fence, pen, gate, or free stall barn system.

In the afore described embodiments, the opening of the swivel connector is an annular design in order to accommodate a rail or rod that is approximately round. However, a swivel connector design that utilizes an opening that is oval, triangular, square, hexagonal, or any other shape that will match the shape of construction materials that are used for fences and rail systems will be within the scope of this invention.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 1 is a perspective view of a free stall system using coated fiberglass apparatus according to certain embodiments of the present invention.

FIG. 2 is a perspective view of a free stall system using coated fiberglass apparatuses according to an embodiment of the present invention, such that the coated fiberglass apparatus is used to form two separate free stalls.

FIG. 3A is a top view of an upper clamping member that can be utilized to connect two fiberglass apparatuses according to an embodiment of the present invention.

FIG. 3B is side view of a lower clamping member that can be utilized to connect two fiberglass apparatuses according to an embodiment of the present invention.

FIG. 7 is a perspective view of a pre-wash and grinder assembly arranged within the system illustrated in FIG. 4 according to an embodiment of the present invention.

FIG. 8 is a perspective view of a coating station arranged within the system illustrated in FIG. 4 according to an embodiment of the present invention, whereby the portion of the fiberglass apparatus that has been coated is represented in dots while the uncoated portion of the fiberglass apparatus has no indicators. In subsequent steps of the manufacturing process of the fiberglass apparatus having been coated, the coated fiberglass apparatus is not illustrated with dots, but is to be understood that it has gone through the coating process.

FIG. 9 is a perspective view of the transfer arm assembly and the drying station assembly arranged within the system illustrated in FIG. 4 according to an embodiment of the present invention.

FIG. 10A is a front view of a fiberglass apparatus in use in an electrical fencing system according to an embodiment of the present invention.

FIG. 10B is a side view of two fiberglass apparatus arranged in an electrical fencing system according to an embodiment of the present invention.

FIG. 10C is a rear view of a fiberglass apparatus in use in an electrical fencing system according to an embodiment of the present invention.

FIG. 12 is a side perspective view of the connector piece of the present invention with the attachment hardware installed to a horizontal tubular rail, the connector piece with hardware being shown prior to being mated to another connector piece in order to form the swivel connector.

FIG. 13 is a perspective view of a plurality of swivel connectors of the present invention as they are affixed to a vertical rail of the type it is sized to accommodate, the swivel connector also having a swivel connection to another connector piece forming a two-piece swivel connection according to certain aspects of the present invention.

FIG. 14A is an exploded cross sectional view of a connector piece attachable to a baseplate that can be affixed to a flat surface, the connector piece and baseplate forming a swivel connection according to certain aspects of the present invention.

FIG. 14B is an exploded cross sectional of a connector piece attachable to an alternate style of baseplate that can be affixed to a corresponding surface, such as a square post, the connector piece and baseplate forming a swivel connection according to certain aspects of the present invention.

FIG. 15A is a top cross-sectional view of a connector piece attachable to a corresponding surface, such as a fence post, by means of an elongated threaded fastener according to certain aspects of the present invention.

FIG. 15B is a side partial cross-sectional view of the connector piece attachable to the object of FIG. 15A.

Figure 3C:
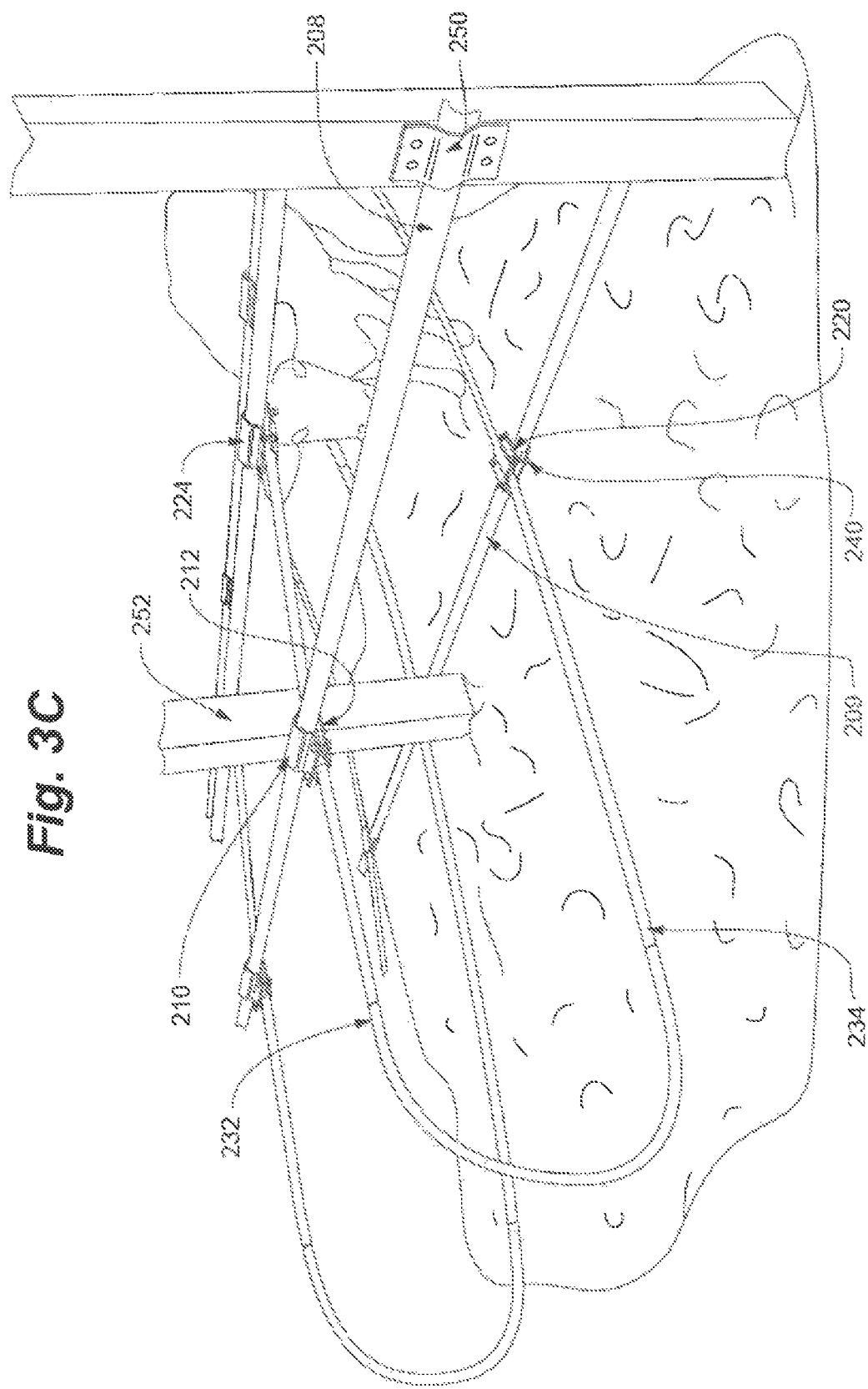
FIG. 3C illustrates the use of the clamping members of FIGS. 3A and 3B in the free stall system of FIGS. 1 and 2 according to an embodiment of the present invention.
Figure 4:
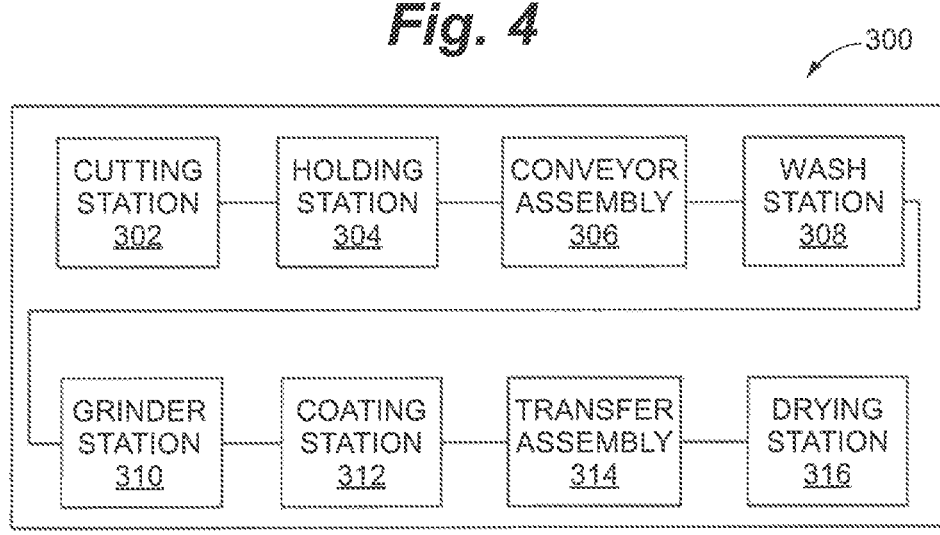
FIG. 4 is a block diagram of a system for manufacturing a fiberglass apparatus according to an embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIGS. 1 and 2, a perspective view of a free stall system 100 is shown according to an embodiment. In embodiments, the free stall system 100 can comprise a plurality of free stall units 102 that are adjacently arranged and can be equidistantly spaced apart in a substantially parallel relationship to one another. Each of the free stall units 102 can comprise a first and a second divider 104, 106 that is connected to an upper and lower center support rod 108, 109 via clamp members 110. In embodiments, the first and second dividers 104, 106 each can comprise an upper and lower rail member 112, 114 that are joined via a connection loop 118 having a generally arcuate configuration. In some aspects, the connection loop 118 has a U-shaped configuration. The upper and lower rail members 112, 114 can comprise a substantially rigid material, such as fiberglass, which is particularly advantageous as a result of its high strength and corrosion resistant properties. In certain aspects, the upper and/or lower rail members 112, 114 can comprise a substantially rigid material, such as a fiberglass material having a coating, which is particularly advantageous as a result of its high strength, corrosion resistant properties, and UV-light protection of the coating. In some aspects, the coating is applied to the fiberglass material according to certain aspects of the present invention described herein.

As depicted, in embodiments, the upper and lower rail members 112, 114 each can extend between an upper and lower rail member proximal end 122a, 122b and an upper and lower rail member distal end 124a, 124b, with the proximal end 122a, 122b being defined as the end farthest away from the connection loop 118 and with the distal end 124a, 124b being defined as the end which is closest. At the proximal ends 122a, 122b, upper and lower rail members 112, 114 can be removably coupled to the upper and lower center support rods 108, 109, which are arranged substantially perpendicular to rail members 112, 114. Additionally, at distal ends 124a, 124b, the upper and lower rail members 112, 114 can further comprise at least one bore hole (not shown) that is configured to receive a fastener to secure the upper and lower rail members 112, 114 to connection loop 118.

Although the free stall system 100 disclosed herein is described as a single free stall system, it should be noted that system 100 may vary in embodiments. For example, as shown in FIG. 2, in other embodiments, the free stall system 100 can comprise a dual free stall system 200 having a plurality of free stall units 202, 204 arranged on opposing sides of the upper and lower center support rods 208, 209. In such a configuration, each of the upper and lower rail members 232, 234 can be sized twice as long and can be coupled to at least two upper and lower center support rods 208, 209.

In embodiments, referring now to FIGS. 3A-3C, clamp members 110 can comprise a first and second clamping element 210, 212. In embodiments, the first and second clamping elements 210, 212 can comprise end portions 220, 222 integrally formed with an intermediate portion 224 having a generally inverted V-shaped structure. End portions 220, 222 can comprise a plurality of clamping bores 228 defined therewithin, which are configured to receive a plurality of clamping fasteners 240 for coupling the first and second clamping elements 210, 212 and to secure positioning of the upper and lower rail members 112, 114 and center support rods 108, 109. The first and second clamping elements 210, 212 and center support rods 108, 109, similar to rail members 112, 114, can also be constructed from resilient materials, including, but not limited to, fiberglass, stainless steel, high carbon steel, aluminum, metal alloys, or the like. Additionally, the first and second clamping elements 210, 212 can range in size from about 1 inch to 2⅜ inches according to design requirements.

Next, the upper and lower rail members 112, 114 and connection loop 118 can be pre-assembled prior to installation, or may be assembled onsite during installation of system 100, thereby forming the first and second dividers 104, 106 of the free stall units 102. During installation, the first and second dividers 104, 106 are positioned substantially parallel to each other, with the connection loop 118 facing outwardly and away from the center support rods 108, 109. As shown in FIGS. 3A-3C, as a final step, the upper and lower rail members 112, 114 are then coupled to upper and lower center support rods 108, 109 via clamp members 110. In particular, the first and second clamping members 210, 212 are arranged substantially perpendicular to one another with the first clamping member 210 being positioned on an upper surface of the upper center support rod 108 and the lower ail member 114, and the second clamping member 212 being positioned on a lower surface of the upper rail member 112 and lower center support rod 109. To secure fastening of the first and second clamping members 210, 212, each of clamping bores 228 are coaxially aligned and each of clamping fasteners 232 are extended therethrough. Additionally, to provide additional structural support, the upper center support rod 108 can be mounted to a plurality of vertical posts 252 arranged within the free stall barn via a support clamping member 250 as shown in FIG. 3C in some embodiments. In other embodiments, the upper center support rod 108 and each of the upper and lower rail members 112, 114, which are arranged substantially perpendicular to the upper center support rod 108, may be mounted on opposing sides of the plurality of vertical posts 252 via a support clamping member 250.

To form the free stall system 100, each of the upper and lower rail members 112, 114 can be initially washed and ground prior to installation utilizing a specific grinding technique in which an abrasive is employed. In some aspects, the abrasive has a grit size in a range of about 30 to about 100 grit, in other aspects about 40 to about 90 grit, in other aspects about 50 to about 85 grit, and in certain other aspects about 60 to about 80 grit. Once the grinding process is complete, the rail members 112, 114 can be coated with an ultraviolet coating to increase the wear life of the rail members, as well as to prevent the formation of slivers and corrosion caused by environmental conditions and exposure to substances such as urine or feces. Similarly, to prevent decreased wear and corrosion of connection loop 118, connection loop 118 can be coated with a zinc or similar material plating during the fabrication process.

Referring to FIGS. 4-9, a system 300 for manufacturing a fiberglass apparatus is shown according to certain embodiments. In certain embodiments, system 300 can comprise at least one cutting station 302, a holding station 304, a grinding station 310, a coating station 312, and a drying station 316.

Figure 5:
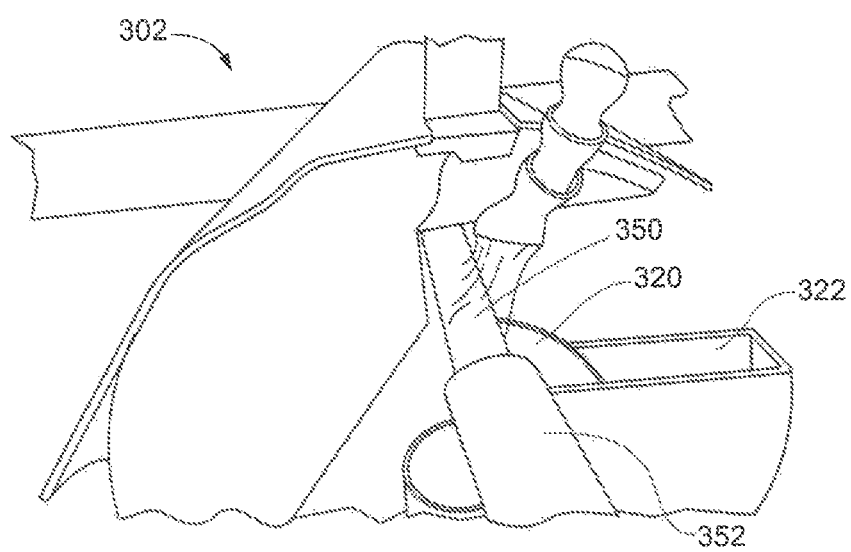
FIG. 5 is a perspective view of a cutting station arranged within the system illustrated in FIG. 4 according to an embodiment of the invention.

As illustrated in FIG. 5, the at least one cutting station 302 can be arranged at a front end of system 300 and can comprise a means for cutting a starting fiberglass material. In some aspects, the starting fiberglass material is cut to remove at least one end piece. In some aspects, the starting fiberglass material is cut to a desired size for processing. In some aspects, the starting fiberglass material is cut to remove an end piece from each end of the fiberglass material. In some aspects, the fiberglass material is reused, reclaimed and/or recycled from oil drilling operations, such that end pieces need to be removed to utilize a useful portion thereof. In some aspects, the means for cutting the starting fiberglass material is a cutting blade, such as a diamond blade. Referring now to the exemplary figures, cutting blade 320 can be mounted within an enclosure 322 that is operable to sever an end portion 352, such as a metal piece, from a fiberglass apparatus 350. This allows for the fiberglass apparatus 350 to be cut to various desired lengths including, but not limited to about 35 feet, about 50 feet, about 90 feet, about 100 feet, or other shorter or longer lengths specific and suitable to design and/or application requirements. In some aspects, the fiberglass apparatus 350, after being cut, has a length between about 1 foot to about 200 feet, in some aspects between about 5 feet and about 190 feet, in some aspects between about 10 feet and about 175 feet, in some other aspects between about 25 feet and about 150 feet, and in some other aspects between about 35 feet and about 100 feet, with one of ordinary skill in the art appreciating the length of the fiberglass apparatus 350 can vary in length depending upon the suitable design and/or application requirements and/or processing requirements.

In other embodiments, although not shown, a cutting station can be arranged at a back end of system 300 and can comprise a means for cutting a coated fiberglass material. In some embodiments, system 300 can comprise a single front end cutting station 302, while in other embodiments, system 300 may comprise two are more cutting stations. For example, in certain aspects, system 300 may comprise a first cutting station that is configured to size the initial fiberglass apparatus 350 to a first length (e.g., 90 feet), whereas a second cutting station may arranged to size the fiberglass apparatus 350 to a shorter length such as, e.g., 50 feet or less. In some aspects, the first cutting station may sever one end of the initial fiberglass apparatus 350 while the second cutting station may sever the opposite end of the initial fiberglass apparatus 350. In some aspects, system 300 utilizes a first cutting station 302 on one end of the fiberglass apparatus 350 and a second cutting station 302 on the opposite end of the fiberglass apparatus 350. In some aspects, the first and second cutting stations 302 cut the fiberglass apparatus 350 in sequence. In some other aspects, the first and second cutting stations 302 cut the fiberglass apparatus 350 at about the same time. In still some other aspects, the first cutting station 302 cuts a first fiberglass apparatus 350 and then a second fiberglass apparatus 350 before a second cutting station 302 cuts the opposite end of the first fiberglass apparatus 350. In other words, the first and second cutting stations 302 may be spaced apart during the processing line, such that one or more different fiberglass apparatus 350 are cut by the first cutting station 302 before the opposite end is cut by a second cutting station 302. In still some further aspects, a single cutting station 302 may cut a first end of the fiberglass apparatus 350 and then the same cutting station 302 used to cut the fiberglass apparatus 350 to a desired length, two or more desired lengths, and/or to remove a second end of the fiberglass apparatus 350.

In some aspects, the initial fiberglass apparatus 350 is a reclaimed, recycled and/or reused fiberglass rod or fiberglass tube commonly used in the oil industry. In some other aspects, the initial fiberglass apparatus 350 is a fiberglass component reclaimed and/or reused from a different industry. In yet some other aspects, the initial fiberglass apparatus 350 is a new fiberglass component. The term "fiberglass apparatus" should be understood herein to refer to a solid fiberglass rod, a fiberglass tube, or other elongated structure that is substantially comprised of fiberglass, which may have the same or differing diameter over the length of the structure. The holding station 304 is arranged proximate the cutting station 302 and includes a holding frame 340 for holding each severed fiberglass apparatus 350. The holding frame 340 can comprise a plurality of transverse bars 342 attached to a longitudinal bar 344. In addition, the holding frame 340 can comprise a plurality of protruding posts 346, which may be equidistantly spaced apart from one another and positioned so as to form a stop mechanism that prevents the plurality of fiberglass apparatus 350 from sliding off an edge of the holding frame 340. Posts 346 are rotatable about a rotation axis and can comprise a generally L-shaped or other suitable configuration in certain embodiments. Notably, the configuration of posts 346 is such that each post is rotatable between a first postion and a second positon to allow for the release of the fiberglass apparatus 350 from the holding frame 340 and into a conveyor assembly 306 as the next apparatus 350 is ready for processing to ensure continuous run cycles.

Figure 6:
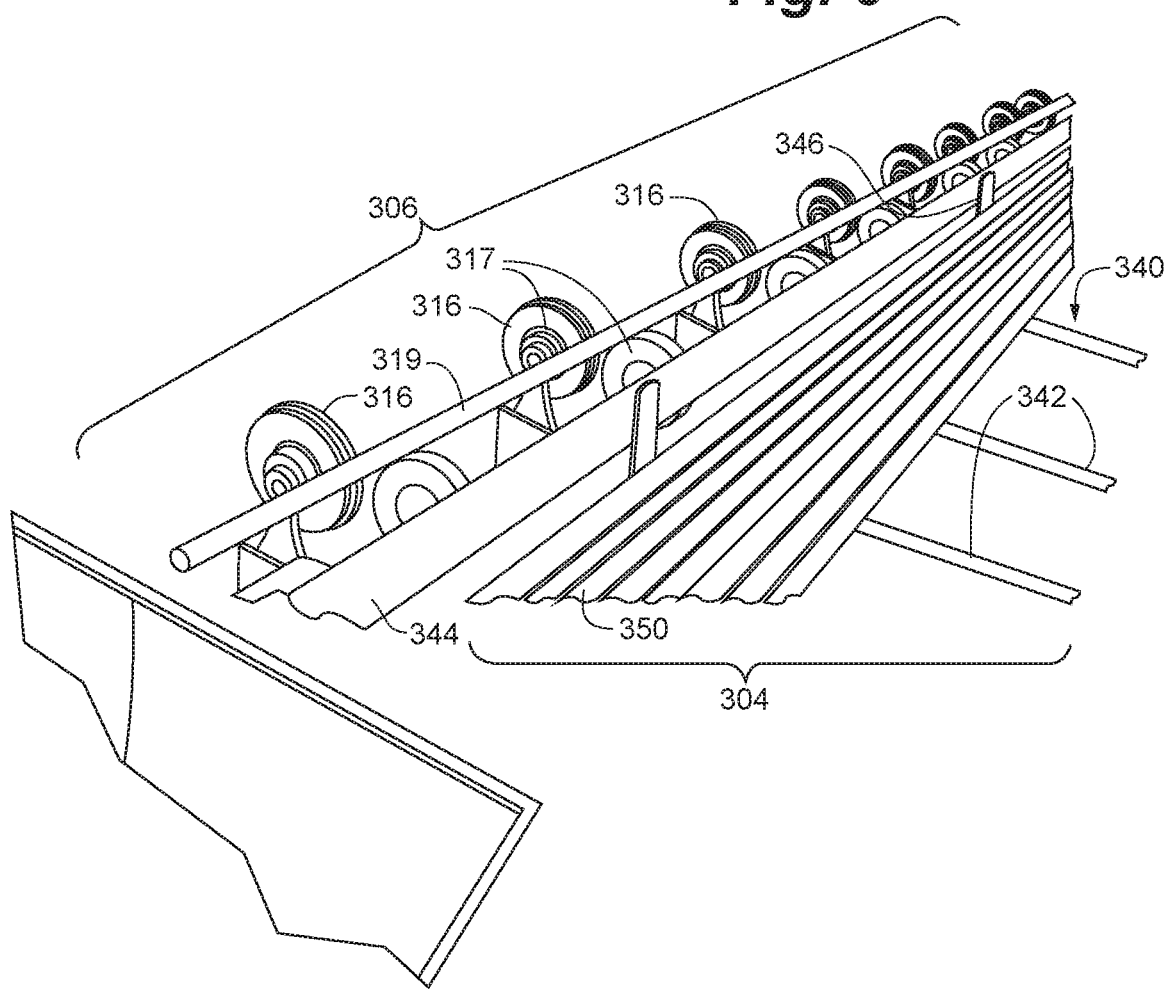
FIG. 6 is a perspective view of a holding station subsequent to the cutting station, the holding station arranged within the system illustrated in FIG. 4 according to an embodiment of the present invention.

Referring now to FIG. 6, the conveyor assembly 306, which is arranged adjacent to the holding station 304, can be utilized to transfer each fiberglass apparatus 350 from the holding station 304 and into the grinder and coating stations 310, 312. In some embodiments, the conveyor assembly 306 can comprise a plurality of conveyor units 316 having at least two rollers 317 that are offset from one another and mounted on opposing sides of a center shaft 319. Each of the rollers 317 rotates at the same speed in a direction perpendicular to the conveying path to ensure continuous and unidirectional rotation of the fiberglass apparatus 350 as it is conveyed throughout the assembly.

Once the fiberglass apparatus 350 is placed on the conveyor assembly 306, the fiberglass apparatus 350 can be continuously spun and rotated as it undergoes the surface preparation process (i.e., the pre-wash, grinding and coating process) prior to reaching drying station 316. Particularly, during the surface preparation process, each fiberglass apparatus 350 is self fed into the grinder station 310 to roughen the outer surface of the fiberglass apparatus 350 to produce a surface profile that is suitable for coating. For example, prior to the grinding process, the surfaces of the fiberglass apparatus 350 can generally be dirty, greasy, shiny, glassy, or fuzzy, thereby making it difficult for coatings to adhere to the surface. In embodiments, the grinder station 310 can optionally comprise a washer 318 mounted adjacent a double sided grinding apparatus 320 that is used to prewash the outer surface of apparatus 350. The double sided grinding apparatus 320 can comprise a first and second grinder wheel 321, 323 arranged on opposing sides of the fiberglass apparatus 350. Each grinder wheel 321, 323 can comprise a diamond grit ranging in size from about 30 grit to 120 grit in various embodiments depending upon the desired surface finish (e.g., coarse or fine) and the type of coating to be applied. In many applications of the present invention, because a ultra-violet (UV) resistant coating is applied to each of the fiberglass apparatuses, it is advantageous to use an abrasive with a grit size of about 70-90 grit, with 80 grit being preferable in certain aspects. In addition, to help ensure continuous rotation of the fiberglass apparatus 350 as it is fed through the grinder station 310, the double sided grinding apparatus 318 can comprise at least two grinder rollers 324.

Upon being washed and ground, the fiberglass appartus 350 exits the grinder station 310 and can be exposed to compressed air 329 and a dryer 328 to remove any residual water or solvent from the fiberglass appartus 350 and be dried prior to the coating station 310.

As the fiberglass apparatus 350 is conveyed from the grinder station 310 into the coating station 312, which is arranged proximate an outlet 325 of the grinder station 310, a coating is applied to prevent and minimize corrosion of apparatus 350. Coating station 312 can comprise a plurality of coating guide rollers 332 and a spray nozzle 334 pivotally mounted to a sprayer arm 336 to ensure uniform application of the coating solution to the fiberglass apparatus 350. For example, as the rod is continuously rotated, one or more coating layers are applied to ensure homogeneous application of the coatings to the rod. In embodiments, various coating techniques may be utilized such as, for example, liquid or powder coating techniques. In certain aspects, the liquid or powder coatings may comprise a UV-resistant coating material that additionally helps to protect the fiberglass apparatus 350 from environmental effects such as extreme sun exposure. In some aspects, the coating comprises a UV-resistant material to prevent and minimize corrosion and sunlight damage. In some aspects, the coating station 312 may comprise two or more spray nozzles 334, such that more than one coating of the same material or different materials may be applied to the fiberglass apparatus 350. In some aspects, a first primer coating may be applied by a first spray nozzle 334 prior to a second UV-resistant coating being applied by a second spray nozzle 334. In other aspects, a drier may be employed between the first spray nozzle 334 and the second spray nozzle 334 to help dry to the coating prior to a second coating being applied.

In some embodiments, system 300 can further comprise a transfer assembly 314 having a first and second transfer arm 360, 362, each movable between a first and second position as shown in FIGS. 8 and 9, to transport the fiberglass apparatus 350 from the coating station 312 to the drying station 316 where a coating may be cured. Each transfer arm 360 and 362 can comprise an upper arm portion 363a, 363b and a lower arm portion 365a, 365b. The upper arm portions 363a, 363b can comprise a generally arched shaped and can extend between a first end 366a and a second end 366b, wherein the second end 366b can be configured with a claw like member 367 having a pointed tip. The lower arm portion 365a of the first transfer arm 360 can comprise a support plate 369 having a holding unit 370 arranged therein which is sized to receive and engage with an end portion of the fiberglass apparatus 350. The lower arm portion 365a can further comprise at least two transfer rollers 371a, 371b that are each offset from a center axis 377 of the support plate 369. Actuation of each the at least two rollers 371a, 371b is triggered upon engagement of the fiberglass apparatus 350 with support plate 369, wherein upon actuation, rollers 371a, 371b are spun to continuously rotate the fiberglass apparatus 350 as it transferred from the conveyor assembly 306 to the drying station 316. In other related aspects, it should be noted that the arrangement of the lower arm portions 365a, 365b may vary, and can comprise, e.g., fewer or more rollers or a support arm, such as support arm 373 illustrated in FIG. 8 that helps to secure positioning of the fiberglass apparatus 350 in holding unit 370. Similar to lower arm portion 365a, lower arm portion 365b of the second transfer arm 362 may also comprise at least two transfer rollers 375a, 375b that are arranged to facilitate continuous rotation of the fiberglass apparatus prior to transfer to drying station 316. Once the fiberglass apparatus 350 has completed the surface preparation process and is ready to be transferred to drying station 316, each of lower arm portions 365a, 365b transition from a transfer position to a release position. In the release position, lower arm portions 365a, 365b are raised to an angular position (e.g., approximately 40-60° to allow release of the fiberglass apparatus 350 into drying station 316.

During each of the pre-wash, grinding, coating and transferring positions, the rotation of the fiberglass apparatus 350 may be variable depending upon the size of the fiberglass apparatus. In some aspects, the fiberglass apparatus 350 is rotated such between about 0.001 of an inch to about 0.005 of an inch of fiberglass material is removed, in some other aspects between 0.001 of an inch up to about 0.05 of an inch, in some other aspects up to about 0.3125 of an inch of fiberglass are removed as the elongated fiberglass apparatus 350 passes through the grinding station.

Drying station 316 can comprise at least two horizontal holding beams 370 each comprising a plurality of drying clamps 372 arranged atop of the holding beams 370 and being sized to accommodate a portion of the fiberglass apparatus 350. In one embodiment, the fiberglass apparatus 350 can be cured (i.e., dried) utilizing conventional drying techniques such as, e.g., air drying. In other embodiments, various curing technologies such as UV curing, hot air curing, infrared curing, electrical curing or others can be employed to accelerate and to reduce drying times. In still other embodiments, system 300 may comprise two or more drying stations with FIG. 9 being but one exemplary embodiment.

In other optional embodiments, although not depicted, system 300 can further comprise a second cutting station arranged adjacent drying station 316 that additionally reduces the size of each fiberglass apparatus 350 from the initial sizing performed at cutting station 302 (e.g., from about 90 feet to 36 feet). Once the apparatus is severed and sized accordingly, the fiberglass apparatus 350 may be fed through a bundler (not shown) where, in one embodiment, the fiberglass apparatuses 350 are bundled in bulk units. In certain aspects, the number of units can comprise between 10 to 100 units. It should be noted, however, that in other embodiments, the fiberglass apparatus 350 may be bundled in fewer or more units.

Once the fiberglass apparatus 350 is cured, it may be used in various applications. For example, in one embodiment, the fiberglass apparatus 350 can be installed to form a gate. In other aspects, the fiberglass apparatus 350 can be installed in an electrical fencing system 400 for used for livestock, such as in a horse pasture (see FIG. 10A). The electrical fencing system 400 can comprise a plurality of elongate posts 402 each manufactured utilizing the system and method discussed with reference to FIGS. 4-9 In some embodiments, each of the plurality of elongate posts 402 can comprise at least one aperture 404 formed in or on a surface 405 of posts 402, such that the apertures are similarly spaced and coaxially aligned with one another as shown in FIG. 10B. In some embodiments, aperture 404 formed on each of the plurality of posts 202 can be sized to receive a conductive wire 406, but may vary in other embodiments. In alternative embodiments, the aperture 404 formed in each of the plurality of posts 402 can receive a smaller diameter fiberglass apparatus according to certain embodiments of the present invention. In such an embodiment, the entirety or a portion of the horizontal components of the fencing system 400 can comprise fiberglass as well as the vertical posts.

In other exemplary embodiments, such as system 250 illustrated in FIG. 10C, posts 452 can comprise fiberglass tubes with hollow enclosures. Posts 452 may also comprise apertures, such as apertures 404, that are sized to receive an alternative element such as fiberglass or an electrical rod 456. In still other embodiments, each of the plurality of posts 452 may be designed to include a stake element (not shown) having a pointed tip to facilitate removable insertion into a ground surface. In various embodiments, the plurality of elongate posts 452 and/or electrical rod 456 can comprise fiberglass, a solid fiberglass rod, a fiberglass tube, or combinations thereof. Additionally, apertures 402 can comprise generally circular, oval, rectangular, or square shapes, other suitable configurations, or combinations thereof in various embodiments.

In yet another embodiment, the fiberglass apparatus may be used to form free stalls as previously discussed.

Figure 11:
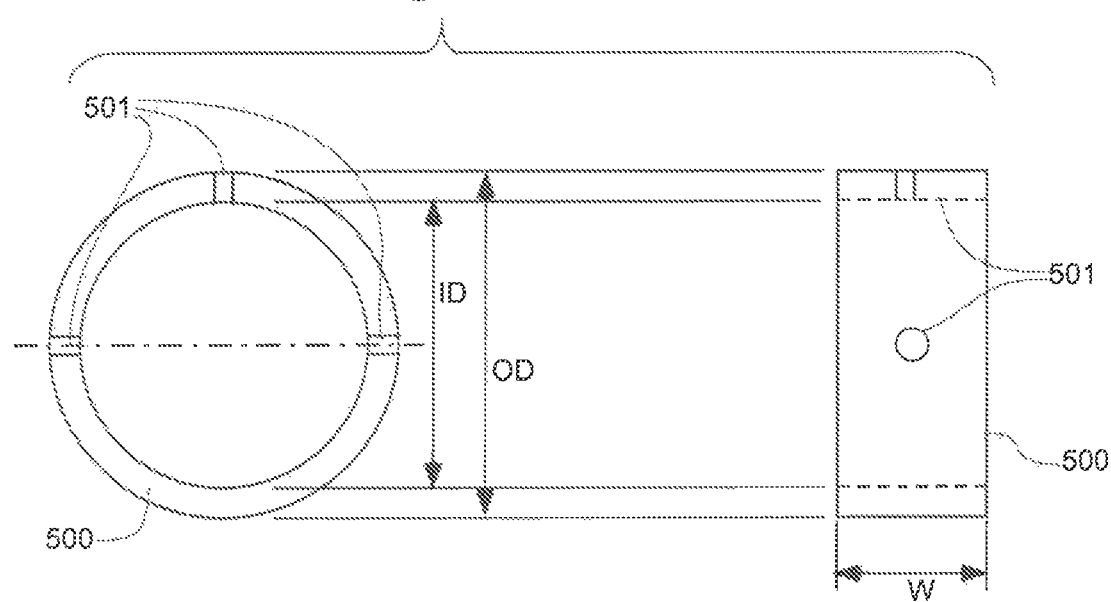
FIG. 11 is a cross-sectional and side cross-section view of a connector piece of the present invention.

In addition, rail members can be connected by using various connectors. Referring to FIG. 11, an end and side view drawing of the mechanical design of an connector piece 500 showing the annular design having an inside diameter (ID), outside diameter (OD), and width (W). One or more threaded holes 501 exist around the periphery of said connector piece 500, with their axis being normal to the outer surface of said connector piece 100. Each threaded hole 501 has threading through its full thickness, from the point of the outer diameter to the inner diameter, and has dimensions that will accommodate the machine threads that have been specified for the particular embodiment. In the illustrated embodiment there are three said threaded holes 501 in connector piece 500, with two being directly opposite each other and the third being displaced 90 degrees from the other two. However different embodiments may consist of any number of threaded holes 501, including a single threaded hole 501. In the illustrated embodiment the axial location of each threaded hole 501 is in the center of the connecter piece 501 as viewed from the side, centered within its width (W). However different embodiments may have the threaded holes 501 at different axial positions, and there is not a requirement that they all have the same axial alignment.

In some aspects, the ID of the connector piece 500 is between about ½ inch to about 12 inches, in some aspects about ¾ inch to about 8 inches, in some aspects about 1 inch to about 6 inches, and in some other aspects about 1¼ inches to about 3 inches, although one of ordinary skill in the art will appreciate that ranges and subranges within the foregoing ranges are contemplated. In some aspects the OD of the connector piece 500 is between about ¾ inch to about 12¼ inches, in some aspects about 1 inch to about 8 inches, in some aspects about 2 inches to about 6 inches, and in some other aspects about 2¼ inches to about 3 inches, although one of ordinary skill in the art will appreciate that ranges and subranges within the foregoing ranges are contemplated. In some aspects, the difference between the ID and the OD of the connector piece is between about ⅛ inch to about 1 inch, in some aspects between about ¼ inch and about ¾ inch, and in some other aspects between about ¼ inch and about ⅝ inch. In some aspects, the W of the connector piece 100 is between about ¼ inch and about 3 inches, in some aspects between about ½ inch and about 2½ inches, and in some other aspects between about 1 inch and 2 inches.

Referring to FIG. 12, a side view of the connector piece 500 of the present invention with the attachment hardware installed, prior to being mated to another connector piece as would be performed to assemble the swivel connector. As illustrated, the connector piece 500 is installed upon rail 510. Threaded hole 501 at the bottom of the image is shown to contain a threaded fastener 502, inserted in threaded hole 501 with a sufficient amount of thread engagement to hold it in position upon connector piece 500. In this embodiment, said threaded fastener 502 is intended to be tightened upon rail 510 such that the seating point of short threaded fastener 502 makes contact with rail 510 with a force that may be sufficient to secure connector piece 500 to rail 510. In this embodiment threaded fastener 502 is a socket set screw of a type that is commonly used in the threaded fastener industry, however it may be any design of bolt, screw, cap screw, or any other threaded fastener having a design and material of construction that enables it to be sufficient for the purpose of affixing connector piece 500 upon rail 510. One or more of the threaded fasteners 502 may be absent from an embodiment of this invention if it is not necessary for connector piece 500 to be firmly affixed to rail 510. A situation where this may occur, for example, would be when it is desirable to allow rail 510 to move axially or to rotate within connector piece 500, or when attachment of connector piece 500 upon rail 510 may be performed adequately with some other threaded fastener.

Also as shown in this embodiment, threaded fastener assembly 503 comprises a threaded fastener 502, such as a socket set screw of a type that is commonly used in the threaded fastener industry, and a threaded nut 504 that operably engages the threaded fastener 502. In this aspect, the threaded fastener 502 of the threaded fastener assembly 503 may be longer than when the threaded fastener 502 is used to secure the connector piece 500 to rail 510. In this embodiment, threaded fastener 503 is inserted in threaded hole 501 (not visible) with a sufficient amount of thread engagement to hold it in position upon connector piece 500, and threaded nut 504 is installed upon threaded fastener 503. In this embodiment threaded nut 504 is of a type that is commonly used in the threaded fastener industry, however it may be of any design, size, and material of construction that enables it to make thread engagement with threaded fastener 503. In this embodiment, threaded nut 504 may be engaged with threaded fastener 503 by assembling connector piece 500, threaded fastener 503, and threaded nut 504 to create a residual static tensile stress in the threaded assembly that is sufficient to prevent movement of the connector piece 500, threaded fastener 503, and threaded nut 504 relative to each other. Methods of assembling threaded fasteners are known to those who have ordinary skill in the art. In this embodiment threaded nut 504 provides a secondary purpose of creating a spacing between the outer surface of connector piece 500 and the outer surface of a second connector piece 500 when the swivel connector assembly is completed. In other embodiments where it is not necessary or desirable to use a threaded fastener for the purpose of creating a spacing between the connector pieces 500, any other type of mechanical spacer may be used, for example, a mechanical washer that is manufactured from any suitable material. In other embodiments where it is not necessary or desirable to use a threaded nut 504 or any other type of mechanical spacer between the connector pieces 500, said threaded nut 504 or other mechanical spacer may be omitted from the swivel connector assembly while still allowing proper functioning of the swivel connector assembly by connection between the first and second connector pieces using a threaded fastener 502 or 503.

FIG. 13 illustrates an embodiment whereby a plurality of swivel connectors 600 are affixed to rail 510. In this embodiment, each swivel connector 600 is affixed to rail 510 using a plurality of threaded fasteners 502 on each first connector piece 500A (said first connector piece being the one that is attached to rail 510), and the second connector piece 500B is able to be rotatibly positioned to any angle α between the center axes of each swivel connector piece 500A, 500B that comprise said swivel connector 600. It is obvious that the rotatability of each swivel connector 600 is independent of the others in this illustrated embodiment, thereby allowing for the insertion of a rail through the second connector piece 500B at any angle relative to the horizontal rail 510 as illustrated in this embodiment. For example, the swivel connector 600 would allow the two rails to be perpendicular with each other, parallel with each other, or any angle between perpendicular and parallel. This exemplifies the versatility and adaptability of the swivel connector, enabling the erection of a fence that will conform to the contour of the land and the irregularities in surrounding structures.

Referring to FIGS. 14A and 14B, exploded views of an embodiment whereby one swivel connector piece 500 may be attached to a baseplate 520, 521 by means of a threaded fastener 502. In some aspects, connector piece 500 may be attached to baseplate 520, 521 by threaded fastener assembly 503. (Threaded assembly is not 503 is not labeled in this view, but the numbering will be consistent with that used in FIGS. 12 and 13. FIG. 14A illustrates the attachment to a flat baseplate 520, and FIG. 14B illustrates the attachment to a formed baseplate 521. In some aspects, the flat baseplate 520 may be affixed to a flat surface, such as a wall or post, by a fastener that goes through the baseplate, an adhesive, or combinations thereof. In some aspects, the formed baseplate 521 may be affixed to an object, such as a post. These figures show only two possible designs of a baseplate that may be suitable for use with the swivel connector piece 500 to form a swivel connection between the connector piece 500 and the respective baseplate 520, 521, but those who are skilled in the art will recognize that a limitless number of baseplate designs and mounting methodologies may be achieved so long as there is a threaded hole 501 in the baseplate having dimensions to be compatible with threaded fastener 502.

In some aspects, the threaded fastener 502 that is used to secure the connector piece 500 to the rail 510 will have a length that is about ⅛ inch to about 1 inch, in some aspects about ¼ inch to about ¾ inch, and in some other aspects about ⅜ inch to about ⅝ inch longer than the difference between the ID and OD, such that a minimal amount of the threaded fastener 502 sticks out past the OD when the threaded fastener 502 is fastened down to secure the connector piece to the rail 510.

Referring to FIGS. 15A and 15B, exploded views of the swivel connector piece 500 of the present invention connected to a stationary object 530, 531 such as a fence post or wall, by using only a threaded fastener 502 that may be inserted through the width of the stationary object 530, 531. In the illustrated embodiment, said threaded fastener 502 is a threaded rod of any nominal length that will enable it to be inserted through a hole in a post or other stationary object 530, 531, thereby enabling the swivel connector piece to be used for attaching a rail to a post or other stationary object 530, 531, such as would occur in the design and construction of a fence or pen. In other embodiments, a swivel connector piece 500 may be affixed to a wall or other structure by means of passing a threaded fastener 502 through the structure in a manner similar to the illustrated embodiment. Moreover, the illustrated embodiment demonstrates the usage of a threaded bolt, however any suitable threaded fastener such as a threaded rod or carriage screw may be used so long as the machined threads on the suitable threaded fastener will threadably engage with the threaded hole 501 in the connector piece 500. Methods of assembling threaded fasteners are known to those who have ordinary skill in the art.

Figure 16:
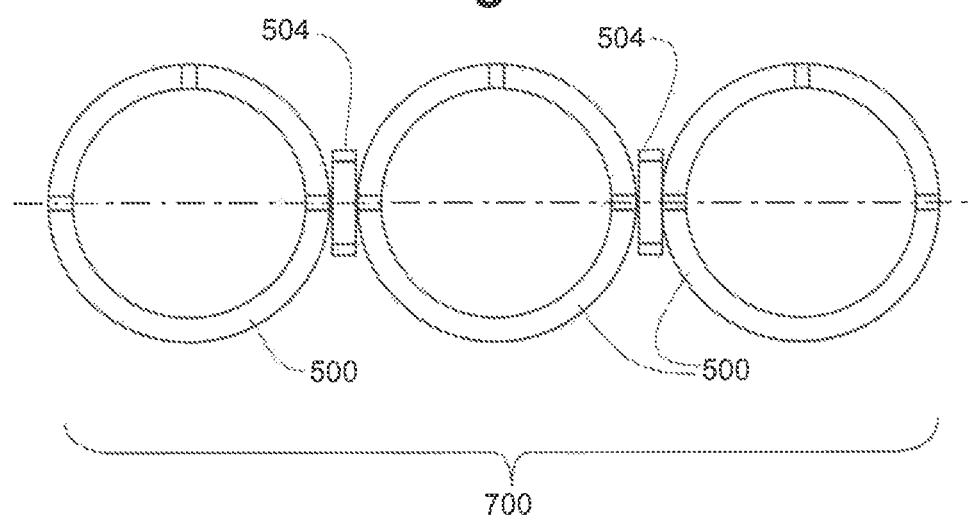
FIG. 16 is a cross-sectional side view of a swivel connector comprised of three connector pieces that have a swivel connection according to certain aspects of the present invention.

Referring to FIG. 16, a side view of the swivel connector of the present invention, three connector pieces 500 are configured to form a three-piece swivel connector 700 to attach three rails 510 to a common rail 510. The angle that is formed between the annular axis of each connector piece 500 and any other is both arbitrary and infinitely variable because of the versatile design of the swivel connector. This illustrated embodiment of a three piece swivel connector 700 is not intended to limit the number of swivel connector pieces 500 that may be joined together on one assembly to three. A greater number of swivel connector pieces 500 may be joined together as may be necessary to accommodate any conceivable design or configuration of rails, partitions, fencing materials, and other structures together.

Figure 17:
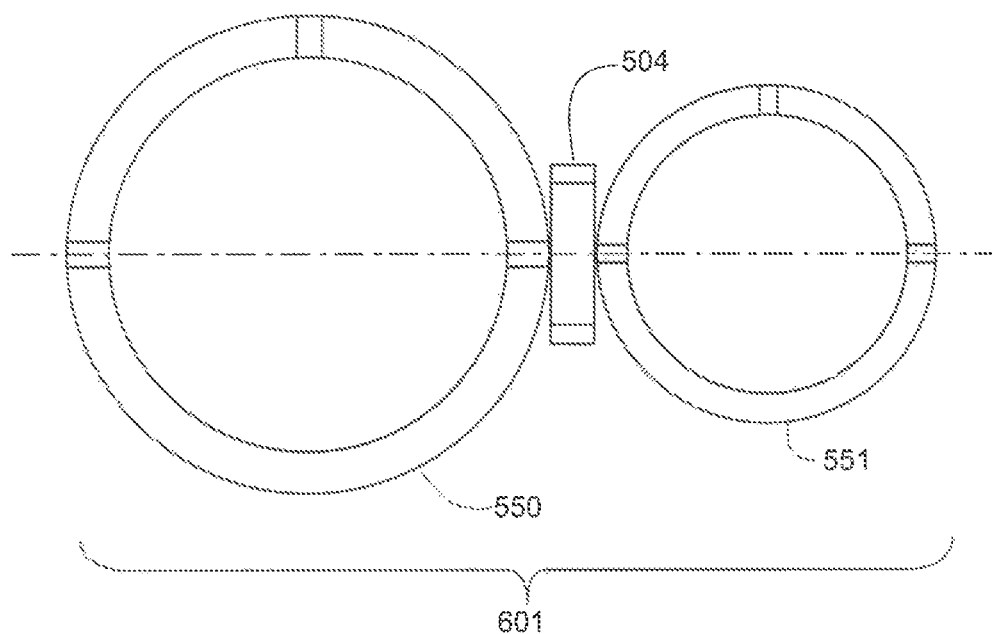
FIG. 17 is a cross-sectional side view of a swivel connector comprised of two connectors, with the two connectors having different diameters from each other according to certain aspects of the present invention.

Referring to FIG. 17, a side view of the swivel connector of the present invention, the swivel connector assembly 601 is illustrated to show the attachment of two rails to each other, wherein one rail diameter is larger than the other. In this embodiment, the first connector piece 550 is larger in diameter than the second connector piece 551, with the inside diameters of these pieces being selected to accommodate the size of two rails being held together by the swivel connector, wherein one rail is of a different diameter than the other. As noted above, the angle that may exist between the annular axis of one connector piece to the other is variable. Moreover, as noted earlier, any number of connector pieces may be threadably attached together. Therefore, it will be obvious to one skilled in the art that any number of connector pieces that are threadably attached to each other, with each having any size that may be similar to or different from the others, is within the scope of the present invention.

In some aspects, the threaded fastener 502 that is used in the threaded fastener assembly 503 to secure the connector piece 500 to another connector piece 500 or a baseplate 520, 521 will have a length that is about ½ inch to about 3 inches, in some aspects about ¾ inch to about 2 inches, and in some other aspects about 1 inch to about 1½ inches long. One of ordinary skill in the art will appreciate that the threaded fastener 502 in the threaded fastener assembly 503 will have a desired length to connect the connector piece 500 to another connector piece 500, baseplate 520, baseplate 521, or stationary object 530, 531, which may also depend on whether or not a threaded nut 504 is utilized.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of reclaiming a used fiberglass apparatus and manufacturing a coated elongated fiberglass apparatus, the method comprising the steps of:
providing an initial previously used elongated fiberglass apparatus having a first end and a second end having a longitudinal axis, wherein the initial previously used elongated fiberglass apparatus has been used in oil drilling operations such that at least one of the first and second ends comprises at least one metal end, wherein the initial previously used elongated fiberglass apparatus having a cylindrical configuration with an outer circumferential surface located between the first second ends, and wherein the outer circumferential surface has an undesired condition that is dirty, greasy, shiny, glassy or fuzzy from the oil drilling operations that makes it difficult for coatings to adhere to the outer circumferential surface;
cutting the least one metal end of the initial previously used elongated fiberglass apparatus to provide an elongated previously used fiberglass apparatus having a desired length;
rotating the elongated previously used fiberglass apparatus about the longitudinal axis to provide a spinning elongated previously used fiberglass apparatus;
grinding the spinning elongated previously used fiberglass apparatus to remove about about 0.001 of an inch to about 0.3125 of an inch of material including fiberglass and the undesired condition from the outer circumferential surface along the longitudinal axis of the elongated fiberglass apparatus to provide a ground elongated fiberglass apparatus having a revitalized outer circumferential surface along the longitudinal axis;
rotating the ground elongated fiberglass apparatus to provide a spinning ground elongated fiberglass apparatus; and
coating the spinning ground elongated fiberglass apparatus with a coating material directly on the revitalized outer circumferential surface to provide the coated elongated fiberglass apparatus.

2. The method of claim 1, further comprising the step of spraying the spinning elongated previously used fiberglass material with a liquid prior to the grinding step.

3. The method of claim 2, further comprising the step of drying the ground elongated fiberglass apparatus prior to the coating step.

4. The method of claim 1, further comprising the step of drying the coated elongated fiberglass apparatus.

5. The method of claim 1, wherein the coating material comprises a UV-resistant material.

6. The method of claim 1, wherein the cutting step further comprises cutting both the first and second ends of the initial previously used elongated fiberglass apparatus prior to the grinding step.

7. The method of claim 6, wherein the initial previously used elongated fiberglass apparatus has a metal end on both the first and second ends that is cut off prior to the grinding step.

8. The method of claim 1, wherein the grinding step removes about 0.001 of an inch to about 0.05 of an inch of fiberglass material including the undesired condition.

9. The method of claim 1, wherein the coating step comprises a first spray nozzle and a second spray nozzle, the first spray nozzle applying a first coating and the second spray nozzle applying a second coating, wherein the second coating is applied after the first coating while the coated elongated fiberglass apparatus is spinning.

10. A method of reclaiming a used fiberglass apparatus and manufacturing a coated elongated fiberglass apparatus, the method comprising the steps of:
providing an initial elongated fiberglass apparatus that has been used in oil drilling operations, the initial elongated fiberglass apparatus having a cylindrical configuration with an outer circumferential surface located between a first end and a second end defining a longitudinal axis, wherein at least one of the first and second ends comprises a metal end, and wherein the outer circumferential surface is in an undesired condition that is dirty, greasy, shiny, glassy or fuzzy that makes it difficult for coatings to adhere to the outer circumferential surface;

cutting the first and second ends including the at least one metal end of the initial elongated fiberglass apparatus to provide an elongated fiberglass apparatus having a desired length;

rotating the elongated fiberglass apparatus having the desired length about the longitudinal axis to provide a spinning elongated fiberglass apparatus;

removing about 0.001 of an inch to about 0.3125 of an inch of material including fiberglass and the undesired condition from the outer circumferential surface along at least a portion of the longitudinal axis of the spinning elongated fiberglass apparatus to provide a recycled elongated fiberglass apparatus having a revitalized outer circumferential surface along the longitudinal axis;

rotating the recycled elongated fiberglass apparatus around the longitudinal axis to provide a spinning recycled elongated fiberglass apparatus;

coating the spinning recycled elongated fiberglass apparatus with a UV-resistant coating material directly on the revitalized outer circumferential surface to provide a coated elongated fiberglass apparatus.

* * * * *